July 8, 1924.
T. G. DADE
1,500,112
OILER
Filed May 14, 1923
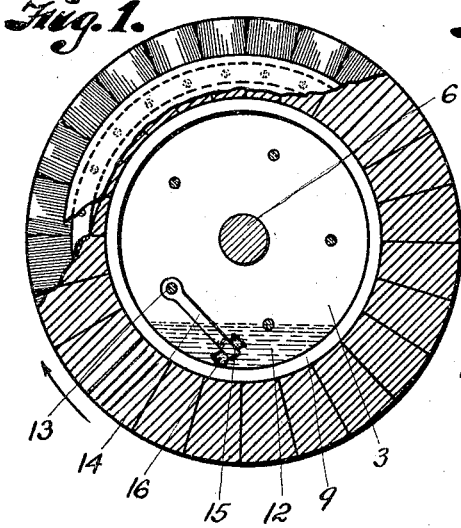
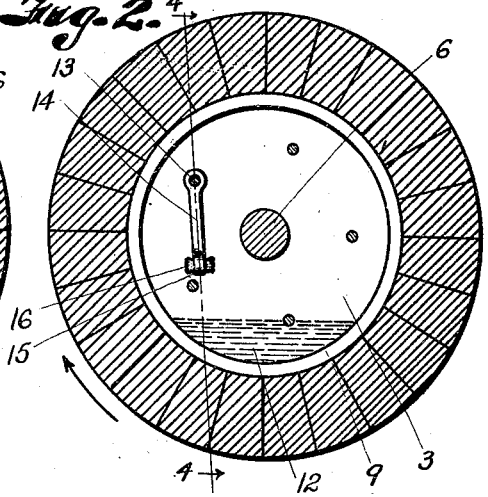
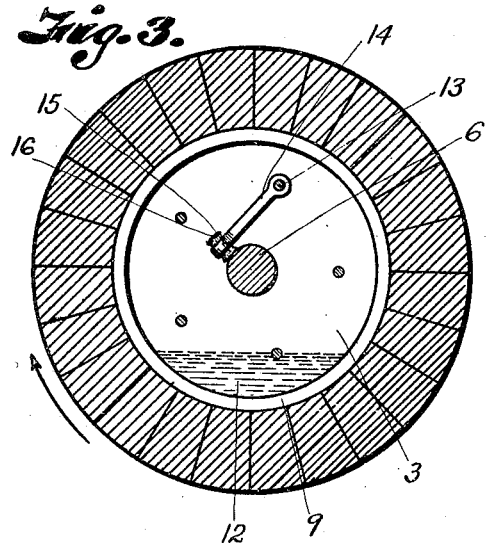
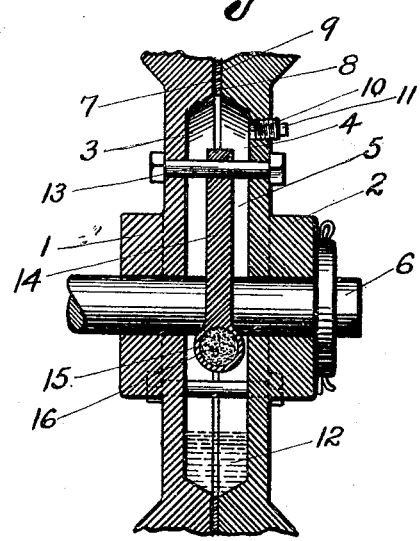
INVENTOR
Thomas G. Dade.
BY
ATTORNEY Patented July 8, 1924.

1,500,112

UNITED STATES PATENT OFFICE.

THOMAS G. DADE, OF ST. MARYS, OHIO.

OILER.

Application filed May 14, 1923. Serial No. 638,879.

*To all whom it may concern:*

Be it known that I, THOMAS G. DADE, a citizen of the United States, residing at St. Marys, in the county of Auglaize and State of Ohio, have invented certain new and useful Improvements in Oilers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to oilers for wheels, the primary object being to provide an oiler element carried within the hub or space within the wheel, the space containing lubricant to be intermittently taken up by the oiler element and transferred to the wheel axle.

It is also the purpose of this invention to provide an oiler which may be conveniently attached to the wheel and which will efficiently perform the service for which it is intended.

I have illustrated one form of my invention in the drawings, in which—

Fig. 1 is a sectional view through a wheel to which my invention is applied, showing the oiler element submerged in the oil.

Fig. 2 is a sectional view showing the oiler element in position to move over into contact with the axle.

Fig. 3 shows the oiler in contact with the axle, and

Fig. 4 is a sectional view on the line 4—4 of Fig. 2.

In so far as this invention relates, the wheel may assume different forms but it is here shown as having two hub members 1 and 2, recessed at 3 and 4 respectively, to provide an oil chamber 5, surrounding the axle 6 which passes through the hub portions 1 and 2. The meeting faces 7 and 8 of the members 1 and 2 are packed against leaking by a packing 9. The oil or lubricant can be introduced into the lubricating chamber 5 through an opening 10, normally closed by a screw plug 11. Since the oil is liquid or semi-liquid, it will gravitate to the bottom of the chamber irrespective of the rotative movement of the wheel and will always assume substantially the position indicated at 12 in the drawings.

Eccentrically located in the lubricating chamber 12 is an oiler arm supporting member shown as a bolt 13, the arm 14 being free to swing on the support 13 and at the free end of the arm is a transverse opening or ring 15 to receive an absorbent material 16, the ends of which preferably extend from opposite sides of the ring or opening.

As the wheel rotates, the free end will dip into the lubricant and then move out to throw the lubricant on the shaft. For example, in the first position, shown in Fig. 1, the oiler may be submerged. At about sixty degrees of rotation, the oiler will be moved out of the lubricant. At about one hundred twenty degrees of rotation of the wheel, the oiler will be swung over to contact with the axle so that the oil absorbed by the absorbent material will be fed onto the axle. The absorbent material will continue to wipe the axle during the time that the wheel is rotated somewhat over two hundred degrees, that is, there will be a long wiping action on the axle, permitting ample time for the oiler to transfer the oil absorbed from the pool or well 12 onto the axle.

The device is adapted to operate either forward or backward, as will be obvious by reference to the drawings.

It will be obvious too, that when the absorbent material first contacts with the axle, it will strike out a slight hammer blow, enough to cause an initial squeezing out of the oil carried by the absorbent head or material 16. Therefore, the effectiveness of the lubrication can be assured.

From the foregoing it will be apparent that the quantity of oil can be maintained within the wheel cavity for a long time because a sufficient quantity can be introduced to carry over a long period.

What I claim and desire to secure by Letters-Patent is:

1. In combination with a wheel having a central cavity and an axle projecting through it, of an oiler member comprising a pivoted lever arm eccentrically mounted in the cavity and having swinging movement toward and away from the axle so as to take up oil from the cavity and deposit it on the axle.

2. In combination with a wheel having a central cavity and an axle projecting through it, of an oiler member comprising a pivoted lever arm eccentrically mounted in the cavity and having swinging movement toward and away from the axle so as to take up oil from the cavity and deposit it on the axle, said lever arm having a body of absorbent material at one end.

3. An oiler for wheels comprising a lever arm support, a lever mounted thereon, and an absorbent material-carrying medium on the free end of the lever arm, the support being adapted to be mounted eccentrically of the interior of a wheel recess to permit the lever arm to move toward and away from the axle.

In testimony whereof I affix my signature.

THOMAS G. DADE.